United States Patent
Nakajima

(10) Patent No.: US 6,757,529 B2
(45) Date of Patent: Jun. 29, 2004

(54) PORTABLE INFORMATION TERMINAL

(75) Inventor: Taketosi Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 589 days.

(21) Appl. No.: 09/734,698

(22) Filed: Dec. 13, 2000

(65) Prior Publication Data

US 2001/0055961 A1 Dec. 27, 2001

(30) Foreign Application Priority Data

Dec. 14, 1999 (JP) .......................... 11-354037

(51) Int. Cl.⁷ ...................... H04M 11/00; H04M 1/00; H04B 1/38
(52) U.S. Cl. ................. 455/407; 455/405; 455/406; 455/550.1; 455/567
(58) Field of Search ................. 455/405, 406, 455/407, 408, 409, 550.1, 412.1, 412.2, 413, 567; 370/252, 253, 352–360, 389; 379/114.01, 114.04, 114.05, 114.06, 114.07, 114.09, 114.17

(56) References Cited

U.S. PATENT DOCUMENTS

| | | | | |
|---|---|---|---|---|
| 5,109,401 A | * | 4/1992 | Hattori et al. | 379/58 |
| 5,602,907 A | * | 2/1997 | Hata et al. | 379/114 |
| 5,757,784 A | * | 5/1998 | Liebowitz et al. | 370/321 |
| 5,784,442 A | * | 7/1998 | Foti | 379/114 |
| 6,088,431 A | * | 7/2000 | Ladue | 379/114 |
| 6,088,687 A | * | 7/2000 | Leleu | 705/400 |
| 6,493,547 B1 | * | 12/2002 | Raith | 455/405 |

FOREIGN PATENT DOCUMENTS

| | | | |
|---|---|---|---|
| EP | 0 813 332 A1 | 6/1997 | |
| EP | 0813 332 A1 * | 12/1997 | .......... H04M/15/28 |
| JP | 4-181855 | 6/1992 | |
| JP | 5-91134 | 4/1993 | |
| JP | 8-331123 | 12/1996 | |
| JP | 11-250137 | 9/1999 | |
| JP | 11-298552 | 10/1999 | |
| WO | WO94/28670 * | 12/1994 | .......... H04M/15/16 |
| WO | WO 97/21299 | 6/1997 | |
| WO | WO 99/57883 | 11/1999 | |
| WO | WO 00/70860 | 11/2000 | |

* cited by examiner

Primary Examiner—William Trost
Assistant Examiner—Meless Zewdu
(74) Attorney, Agent, or Firm—Whitham, Curtis & Christofferson, PC

(57) ABSTRACT

A portable information terminal is disclosed which can prevent a large amount of money from being imposed on a user while the user does not recognize it and wherein an original state of net surfing can be restored readily even if packet communication is disconnected. If a packet communication data integrated amount within an accounting unit period exceeds a maximum value for a packet communication data integrated amount within which the charge is fixed within the accounting unit period, a control section controls a display section to display "excess" and performs a process of an operation set arbitrarily by a user such as, for example, 'disconnect', 'saving' or 'alarm'. This can be prevent a large amount of charge from being imposed on a user while the user does not recognize it. If 'saving' is performed, where the portable information terminal has a browser incorporated therein, automatic image reading of a browser is turned off to save the packet communication data amount.

14 Claims, 2 Drawing Sheets

PORTABLE INFORMATION TERMINAL

BACKGROUND OF THE INVENTION

1. Field of the Invention

The present invention relates to a portable information terminal, and more particularly to a portable information terminal which has a packet communication function.

2. Description of the Related Art

Conventionally, various subscriber contracts between a user of a portable information terminal having a packet communication function and a communication undertaker are available. According to one of such contracts, the imposed charge is fixed while the packet communication data integrated amount within a certain fixed accounting unit period such as, for example, a month remains a certain fixed amount, but if the packet communication data integrated amount exceeds the fixed amount, then a charge which increases in proportion to the excessive packet communication data amount is imposed.

However, according to the accounting based on the packet communication data integrated amount described above, it is not known readily during data communication what amount of data has been communicated when compared with conventional accounting which is based on time. As a result, the portable information terminal is used exceeding the range of the fixed packet communication data integrated amount prescribed in the contract. Consequently, the accounting based on the packet communication data integrated amount has a problem in that a large amount of charge is imposed while the user does not recognize it.

SUMMARY OF THE INVENTION

It is an object of the present invention to provide a portable information terminal which can prevent a large amount of money from being imposed on a user while the user does not recognize it.

It is another object of the present invention to provide a portable information terminal wherein an original state of net surfing can be restored readily even if packet communication is disconnected.

In order to attain the objects described above, according to an aspect of the present invention, there is provided an portable information terminal with a packet communication function, comprising integrating means for sequentially integrating transmission and reception packets within a period set in advance to obtain a packet communication data integrated amount, inputting means for inputting and setting a maximum value for the packet communication data integrated amount within the set period and an arbitrary one of a plurality of first terminal controlling parameters, and control means for comparing the maximum value for the packet communication data integrated amount and the packet communication data integrated amount integrated by the integrating means with each other and causing an operation in accordance with the first terminal controlling parameter inputted by the inputting means to be performed when a first comparison result indicating that the packet communication data integrated amount exceeds the maximum value for the packet communication data integrated amount is obtained.

In the portable information terminal, when the first comparison result indicating that the packet communication data integrated amount exceeds the maximum value for the packet communication data integrated amount within the set period is obtained, an operation in accordance with the first terminal controlling parameter which may be set arbitrarily by the user of the portable information terminal is performed. Therefore, where a parameter representative of a notification or an alarm is set as the first terminal controlling parameter, the user can be notified that the maximum value for the packet communication data integrated amount is exceeded. Further, where the maximum value for the packet communication data integrated amount is a maximum value for a packet communication data integrated amount within which the imposed charge is fixed within an accounting unit period, it can be prevented that a large amount of charge is imposed upon the user while the user does not recognize it.

The inputting means further may input and set an arbitrary one of a plurality of second terminal controlling parameters, and the control means may determine a dynamic estimated packet amount by calculation at a rate of days from the maximum value for the packet communication data integrated amount set arbitrarily within the period set in advance, compare the dynamic estimated packet amount with the packet communication data integrated amount integrated by the integrating means, and perform an operation in accordance with the second terminal controlling parameter inputted by the inputting means when a second comparison result indicating that the packet communication data integrated amount exceeds the dynamic estimated packet amount is obtained.

In the portable information terminal, it is discriminated whether or not the packet communication data integrated amount within an accounting unit period set in advance exceeds a dynamic estimated packet amount so that the situation of use can be grasped at any time even during the accounting unit period. Therefore, limitation to use when the end of the set period comes or waste of a packet amount which can be used without imposition of additional charge can be reduced.

In this instance, the first and second terminal controlling parameters may include a disconnection parameter, and where the disconnection parameter is set as the first terminal controlling parameter by the inputting means, the control means may perform a disconnection process when the packet communication data integrated amount exceeds the maximum value for the packet communication data integrated amount, but where the disconnection parameter is set as the second terminating control parameter, the control means may perform a disconnection process when the packet communication data integrated amount exceeds the dynamic estimated packet amount.

Alternatively, the first and second terminal controlling parameters may include a saving parameter, and where the saving parameter is set as the first terminal controlling parameter by the inputting means, the control means may perform a saving process of stopping automatic image reading when the packet communication data integrated amount exceeds the maximum value for the packet communication data integrated amount, but where the saving parameter is set as the second terminating control parameter, the control means may perform a saving process of stopping automatic image reading when the packet communication data integrated amount exceeds the dynamic estimated packet amount.

In the portable information terminal, when the packet communication data integrated amount exceeds the dynamic estimated packet amount, automatic image reading typically by a browser is stopped. Consequently, self-control in excessive utilization of data communication by net surfing or the like can be urged, and the packet communication data amount can be saved.

The inputting means may further input and set an arbitrary one of a plurality of third terminal controlling parameters, and the control means may determine a dynamic estimated packet amount by calculation at a rate of days from the maximum value for the packet communication data integrated amount set arbitrarily within the set period, compare a threshold value obtained by multiplying the dynamic estimated packet amount by a predetermined coefficient smaller than 1 with the packet communication data integrated amount integrated by the integrating means, and perform an operation in accordance with the third terminal controlling parameter inputted by the inputting means when a third comparison result indicating that the packet communication data integrated amount is smaller than the threshold value is obtained. In this instance, the inputting means may input at least one of a parameter for generating an alarm and another parameter for displaying contents of comparison as the third terminal controlling parameter.

In the portable information terminal, when a third comparison result indicating that the packet communication data integrated amount is smaller than the threshold value which is much smaller than the dynamic estimated packet amount is obtained, an operation in accordance with the third terminal controlling parameter inputted by the inputting means is performed. Consequently, where a parameter representative of a notification or an alarm is set as the third terminal controlling parameter, the user can be notified that the packet communication data integrated amount is small.

The controlling means may store a current URL if browsing is proceeding when a disconnection process is performed. In the portable information terminal, an original state of net surfing can be restored readily.

According to another aspect of the present invention, there is provided a portable information terminal with a packet communication function, comprising integrating means for sequentially integrating transmission and reception packets within an accounting unit period to obtain a packet communication data integrated amount, inputting means for inputting and setting a maximum value for the packet communication data integrated amount within which a fixed charge is imposed within the accounting unit period and first and second terminal controlling parameters, and control means for comparing the maximum value for the packet communication data integrated amount and the packet communication data integrated amount integrated by the integrating means with each other and causing an operation in accordance with the first terminal controlling parameter to be performed when the packet communication data integrated amount exceeds the maximum value for the packet communication data integrated amount is obtained, but causing another operation in accordance with the second terminal controlling parameter to be performed when the packet communication data integrated amount exceeds a dynamic estimated packet amount determined by calculation at a rate of days from the maximum value for the packet communication data integrated amount set arbitrarily within the accounting unit period.

In the portable information terminal, when the packet communication data integrated amount exceeds the maximum value for the packet communication data integrated amount with in which the imposed charge is fixed within an accounting unit period, the portable information terminal can be controlled in accordance with the first terminal controlling parameter. On the other hand, when the packet communication data integrated amount exceeds the dynamic estimated packet amount, the portable information terminal can be controlled in accordance with the second terminal controlling parameter.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
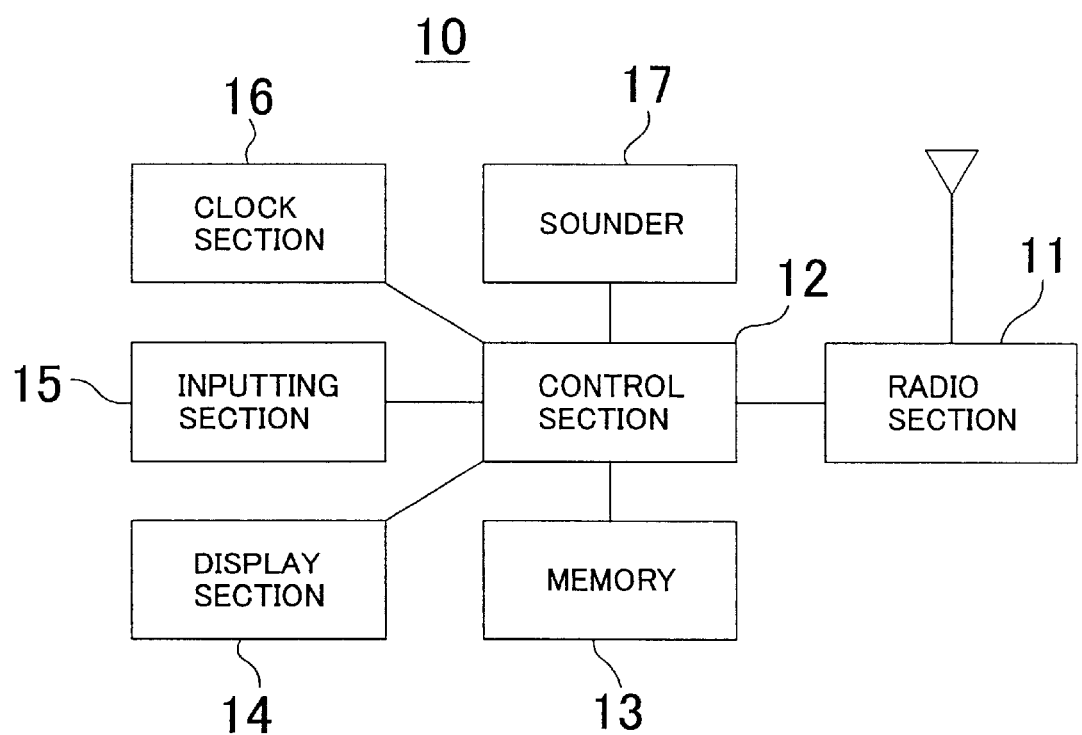
FIG. 1 is a block diagram of a portable information terminal to which the present invention is applied.

Referring first to FIG. 1, there is shown a portable information terminal to which the present invention is applied. The portable information terminal is generally denoted at 10 and includes a radio section 11 for transmitting and receiving a radio signal, a control section 12 including a central processing unit (CPU) for controlling the entire portable information terminal 10, a memory 13 for storing and holding control data of the control section 12, a display section 14 including a liquid crystal display (LCD) unit for user interface, an inputting section 15 having a keyboard, a clock section 16 for obtaining time information (yyy year, mm month, dd day, hh o'clock) Dnow, and a sounder 17 for notifying a user with sound.

The user will use the display section 14 and the inputting section 15 to input subscriber contract information to the portable information terminal 10. The subscriber contract information typically includes Dstart representative of a start hour of an accounting unit time, Dend representative of an end hour of the accounting unit time, and Pmax representative of a maximum value for the integrated amount of packet communication data within which the charge is fixed within the accounting unit time. The subscriber contract information inputted is stored into the memory 13. Now, parameters which are used in the portable information terminal 10 including the subscriber contract information are described with reference to Table 1 and Table 2.

TABLE 1

| | |
|---|---|
| Pmax | User input |
| Dstart | User input |
| Dend | User input |
| Pnow | Packet amount (automatic count) |
| Dnow | Acquired from clock section 16 |
| Pmove | $Pmove = Pmax \cdot \dfrac{Dnow - Dstart}{Dend - Dstart}$ |
| k | User input |

Table 1 indicates basic parameters. In Table 1, Pmax is the maximum value for the integrated amount of packet communication data within which the charge is fixed within an accounting unit period; Dstart is the start time of the counting unit period; and Dend is the end time of the counting unit period. The parameters mentioned are inputted by the user. Further, Pnow is the total value of the packet communication data integrated amount within the accounting unit period integrated automatically by the portable information terminal 10. The initial value of Pnow is 0.

Dnow is the time at present and can be acquired from the clock section 16. Pmove is a dynamic estimated packet amount and is calculated at a rate of days with the maximum value Pmax for the integrated amount of packet communication data till the point of time in accordance with the following expression:

$$Pmove=Pmax\{(Dnow-Dstart)/(Dend-Dstart)\}$$

Accordingly, for example, if the accounting unit period is 30 days, then if the time at present is the 10th day from the start of the accounting unit period, then the dynamic estimated packet amount Pmove is given by Pmax×10/30 packets.

Further, in Table 1, k is a dynamic estimated packet amount under factor for discriminating that the current packet amount is smaller than the dynamic estimated packet amount Pmove. For example, if it is intended to discriminate that the current packet amount is smaller when the total value Pnow of the packet communication data integrated amount is smaller than 600 packets where the dynamic estimated packet amount Pmove is 1,000 packets, then k is 0.6 (=600/1000). The dynamic estimated packet amount under factor k is a positive real number smaller than 1 and is inputted by the user.

TABLE 2

| Parameter | Mode 1 | Mode 2 | Mode 3 |
|---|---|---|---|
| 'Notification' | ○ | ○ | ○ |
| 'Alarm' | ○ | ○ | ○ |
| 'Saving' | ○ | ○ | X |
| 'Disconnect' | ○ | ○ | X |
| 'off' | ○ | ○ | ○ |

In this Table 2, mode 1 represents operation when the current packet communication data integrated amount Pnow exceeds the maximum value Pmax for the packet communication data integrated amount (Pnow>Pmax); mode 2 represents operation when the current packet communication data integrated amount Pnow exceeds the dynamic estimated packet amount Pmove (Pnow>Pmove); and mode 3 represents operation when the current packet communication data integrated amount Pnow is lower by a great amount than the dynamic estimated packet amount Pmove (Pnow<Pmove×k).

Further, in Table 2, the mark ○ represents a parameter which can be set (parameter for terminal control), and the mark X represents a parameter which cannot be set (parameter for terminal control). Further, the parameter 'notification' is used to perform only display to the user using the display section 14 and continue packet communication. The parameter 'alarm' is used for notification to the user with voice by the sounder 17 and simultaneously for display using the display section 14. The parameter 'saving' is used to automatically turn off automatic image reading of a browser (packet portable information terminal in which a browser function is incorporated) in order to save the packet communication data integrated amount and simultaneously perform display using the display section 14.

The parameter 'disconnect' is used to perform disconnection processing of the packet communication state. The parameter 'off' signifies that packet communication is continued as it is without performing any operation. The user can set an arbitrary one of a plurality of parameters which can be set as indicated by the mark ○ in Table 2 for each of the mode 1, mode 2 and mode 3. Accordingly, for example, the user can set 'disconnect' for the mode 1, 'saving' for the mode 2, and 'notification' for the mode 3.

It is to be noted that the reason why 'saving' or 'disconnect' cannot be set for the mode 3 is that, in the mode 3, the packet communication data integrated amount is a very low value as hereinafter described and, in this instance, they are insignificant parameters.

Figure 2:
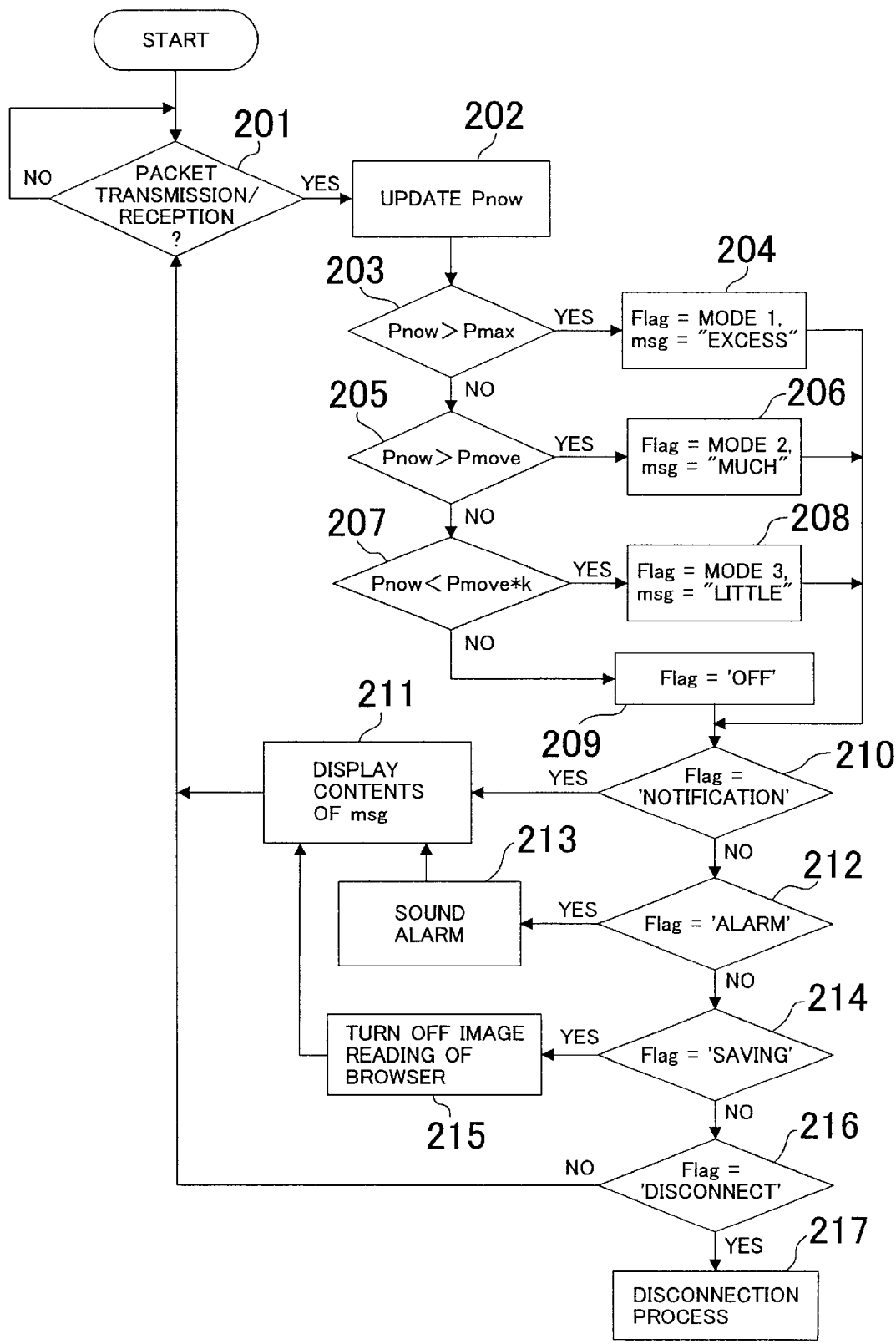
FIG. 2 is a flow chart illustrating operation of the portable information terminal of FIG. 1.

Subsequently, operation of the portable information terminal shown in FIG. 1 is described in detail with additional reference to a flow chart of FIG. 2. Values of the parameters Pmax, Dstart, Dend, k and mode 1 to mode 3 inputted by the user are stored one by one in the memory 13 of the portable information terminal 10.

In this state, the control section 12 first monitors transmission/reception of packet data (step 201). When a transmission packet to be outputted to the radio section 11 is generated or when a packet is received through the radio section 11, the control section 12 increments and updates the current packet communication data integrated amount Pnow within an accounting unit period with an amount (bit number) by which a packet or packets are transmitted or received actually (step 202). Then, the control section 12 discriminates whether or not the updated packet communication data integrated amount Pnow within the accounting unit period exceeds the maximum value Pmax for the packet communication data integrated amount within which the imposed charge is fixed within the accounting unit period (Pnow>Pmax) (step 203).

If the packet communication data integrated amount Pnow exceeds the maximum value Pmax for the packet communication data integrated amount (Pnow>Pmax), then the control section 12 substitutes the parameter of the mode 1 into a variable Flag and substitutes 'excess' into another variable msg (step 204). However, when the packet communication data integrated amount Pnow does not exceed the maximum value Pmax for the packet communication data integrated amount (Pnow≦Pmax), the control section 12 discriminates whether or not the updated packet communication data integrated amount Pnow within the accounting unit period exceeds the dynamic estimated packet amount Pmove (Pnow>Pmove) (step 205). It is to be noted that the control section 12 uses the preset time Dnow acquired from the clock section 16 to successively calculate the dynamic estimated packet amount Pmove and successively stores a result of the calculation into the memory 13.

When the packet communication data integrated amount Pnow exceeds the dynamic estimated packet amount Pmove (Pnow>Pmove), the control section 12 substitutes the parameter of the mode 2 into the variable Flag and substitutes "much" into the variable msg (step 206). However, when the updated packet communication data integrated amount Pnow does not exceed the dynamic estimated packet amount Pmove (Pnow≦Pmove), the control section 12 discriminates whether or not the updated packet communication data integrated amount Pnow within the accounting unit period is lower by a great amount than the dynamic estimated packet amount Pmove (that is, Pnow<Pmove×k) (step 207).

When the packet communication data integrated amount Pnow is much smaller than the dynamic estimated packet amount Pmove (Pnow<Pmove×k), the control section 12 substitutes the parameter of the mode 3 into the variable Flag and substitutes 'little' into the variable msg (step 208). However, when the packet communication data integrated amount Pnow is not much smaller than the dynamic estimated packet amount Pmove (Pnow≦Pmove×k), the control section 12 substitutes the parameter 'off' into the variable Flag (step 209). After the processing in one of the steps 204, 206, 208 and 209 is completed in this manner, the control section 12 subsequently discriminates whether or not the parameter which was substituted into the variable Flag in step 204, 206, 208 or 209 is 'notification' (step 210).

If the contents of the variable Flag are 'notification', then the control section 12 controls the display section 14 to display contents of the character variable msg, which was designated in step 204, 206, 208 or 209, together with the 'notification' (step 211), whereafter it returns the processing to first step 201. On the other hand, if the contents of the variable Flag are not 'notification', then the control section 12 discriminates whether or not the contents of the variable Flag are 'alarm' (step 212).

If the contents of the variable Flag are 'alarm', then the control section 12 uses the sounder 17 to notify the user of an alarm with voice (step 213) and controls the display section 14 to display the contents of the character variable msg, which was designated in step 204, 206, 208 or 209 (step 211), whereafter it returns the processing to first step 201. On the other hand, if the contents of the variable Flag are not 'alarm', then the control section 12 discriminates whether or not the contents of the variable Flag are 'saving' (step 214).

If the contents of the variable Flag are 'saving', then in order to save the packet communication data amount where the portable information terminal 10 has a browser function incorporated therein, the control section 12 turns off automatic image reading of the browser (step 215) to save the packet communication data amount. Thereafter, the control section 12 controls the display section 14 to display the contents of the character variable msg, which was designated in step 204, 206, 208 or 209 (step 211), and then returns the processing to first step 201. However, if the contents of the variable Flag are not 'saving' either, the control section 12 discriminates whether or not the contents of the variable Flag are 'disconnect' (step 216).

When the control section 12 discriminates that the contents of the variable Flag are not 'disconnect', it discriminates that the contents of the variable Flag are 'off' and does not perform any processing since no processing is required, and the control section 12 returns the processing to step 201. On the other hand, if the control section 12 discriminates that the contents of the variable Flag are 'disconnect', then it performs a disconnection process (step 217). In the disconnection process, if the portable information terminal 10 is a terminal in which a browser function is incorporated and is proceeding with browsing, then it stores the current URL (Uniform Resource Locator) into the memory 13 to establish a state wherein the browsing can be continued any time, and then performs disconnection.

In this manner, in the present embodiment, when the packet communication data integrated amount Pnow within an accounting unit period exceeds the maximum value Pmax for the packet communication data integrated amount within which the imposed charge is fixed within the accounting unit period, "excess" is displayed on the display section 14, and a process of an operation set arbitrarily by the user such as, for example, 'disconnect', 'saving' or 'alarm' is performed. Consequently, it can be prevented that a large amount of charge is imposed on the user while the user does not recognize it.

In this instance, if a disconnection process is to be performed, then since the URL immediately before the disconnection is stored, original net surfing can be restored readily. On the other hand, when a saving process is to be performed, since automatic image reading of a browser is stopped, self-control in excessive utilization of data communication by net surfing or the like is urged, and the packet communication data amount can be saved. Further, since it is discriminated whether or not the packet communication data integrated amount Pnow within an accounting unit period exceeds the dynamic estimated packet amount Pmove, the situation of use can be grasped at any time even during the accounting unit period by the user.

It is to be noted that the present invention is not limited to the embodiment described above. For example, the start time Dstart and the end time Dend of an accounting unit period can be automatically calculated and updated using the time information Dnow (mm month, dd day), which can be acquired from the clock section 16, while only information of a delimiting point (such as the first day of every month) of an accounting unit period is inputted by the user.

Further, it is described that the disconnection process in step 217 is performed by automatic disconnection in the portable information terminal 10 of the embodiment described above and the URL is stored with a portable information terminal in which a browser function is incorporated. However, such disconnection may alternatively be performed manually. Further, the start time Dstart and the end time Dend are described as delimiting points of an accounting unit period. However, also it is possible to set the accounting unit period to a period preferable to the user such as, for example, one week or one day. Furthermore, the display performed by the display section 14 in step 211 is not limited to a character display but may be in the form of a graphic form or an icon.

While a preferred embodiment of the present invention has been described using specific terms, such description is for illustrative purposes only, and it is to be understood that changes and variations may be made without departing from the spirit or scope of the following claims.

What is claimed is:

1. A portable information terminal with a packet communication function, comprising:

integrating means for sequentially integrating transmission and receipt packets within a period set in advance to obtain a packet communication data integrated amount;

inputting means for inputting and setting a maximum value for the packet communication data integrated amount within the set period and a first and a second terminal controlling parameters; and control means for comparing the maximum value for the packet communication data integrated amount and the packet communication data integrated amount integrated by said integrating means with each other and causing an operation in accordance with the first and second terminal controlling parameters inputted by said inputting means to be performed when a first comparison result indicating that the packet communication data integrated amount exceeds the maximum value for the packet communication data integrated amount is obtained.

2. A portable information terminal with a packet communication function, comprising:

integrating means for sequentially integrating transmission and receipt packets within a period set in advance to obtain a packet communication data integrated amount;

inputting means for inputting and setting a maximum value for the packet communication data integrated amount within the set period and an arbitrary one of a plurality of first terminal controlling parameters;

control means for comparing the maximum value for the packet communication data integrated amount and the packet communication data integrated amount integrated by said integrating means with each other and causing an operation in accordance with the first terminal controlling parameter inputted by said inputting means to be performed when a first comparison result indicating that the packet communication data integrated amount exceeds the maximum value for the packet communication data integrated amount is obtained;

wherein said inputting means inputs and sets an arbitrary one of a plurality of second terminal controlling parameters, and said control means determines a dynamic estimated packet amount by calculation at a rate of days from the maximum value for the packet communication data integrated amount set arbitrarily within the period set in advance, compares the dynamic estimated packet amount with the packet communication data integrated amount integrated by said integrating means, and performs an operation in accordance with the second terminal controlling parameter inputted by said inputting means when a second comparison result indicating that the packet communication data integrated amount exceeds the dynamic estimated packet amount is obtained.

3. A portable information terminal as claimed in claim 2, wherein the first and second terminal controlling parameters include a disconnection parameter, and where the disconnection parameter is set as the first terminal controlling parameter by said inputting means, said control means performs a disconnection process when the packet communication data integrated amount exceeds the maximum value for the packet communications data integrated amount, but where the disconnection parameter is set as the second terminating control parameter, said control means performs a disconnection process when the packet communication data integrated amount exceeds the dynamic estimated packet amount.

4. A portable information terminal as claimed in claim 2, wherein the first and second terminal controlling parameters include a saving parameter, and where the saving parameter is set as the first terminal controlling parameter by said inputting means, said control means performs a saving process of stopping automatic image reading when the packet communication data integrated amount exceeds the maximum value for the packet communication data integrated amount, but where the saving parameter is set as the second terminating control parameter, said control means performs a saving process of stopping automatic image reading when the packet communication data integrated amount exceeds the dynamic estimated packet amount.

5. A portable information terminal with a packet communication function, comprising:

integrating means for sequentially integrating transmission and receipt packets within a period set in advance to obtain a packet communication data integrated amount;

inputting means for inputting and setting a maximum value for the packet communication data integrated amount within the set period and an arbitrary one of a plurality of first terminal controlling parameters;

control means for comparing the maximum value for the packet communication data integrated amount and the packet communication data integrated amount integrated by said integrating means with each other and causing an operation in accordance with the first terminal controlling parameter inputted by said inputting means to be performed when a first comparison result indicating that the packet communication data integrated amount exceeds the maximum value for the packet communication data integrated amount is obtained;

where said inputting means inputs and sets an arbitrary one of a plurality of third terminal controlling parameters, and said control means determines a dynamic estimated packet amount by calculation at a rate of days from the maximum value for the packet communication data integrated amount set arbitrarily within the set period, compares a threshold value obtained by multiplying the dynamic estimated packet amount by a predetermined coefficient smaller than 1 with the packet communication data integrated amount integrated by said integrating means, and performs an operation in accordance with the third terminal controlling parameter inputted by said inputting means when a third comparison result indicating that the packet communication data integrated amount is smaller than the threshold value is obtained.

6. A portable information terminal as claimed in claim 5, wherein said inputting means inputs at least one of a parameter for generating an alarm and another parameter for displaying contents of comparison as the third terminal controlling parameter.

7. A portable information terminal as claimed in claim 3, wherein said controlling means stores a current URL if browsing is proceeding when a disconnection process is performed.

8. A portable information terminal with a packet communication function, comprising:

integrating means for sequentially integrating transmission and reception packets within an accounting unit period to obtain a packet communication data integrated amount;

inputting means for inputting and setting a maximum value for the packet communication data integrated amount within which a fixed charge is imposed within the accounting unit period and first and second terminal controlling parameters; and control means for comparing the maximum value for the packet communication data integrated amount and the packet communication data integrated amount integrated by said integrating means with each other and causing an operation in accordance with the first terminal controlling parameter to be performed when the packet communication data integrated amount exceeds the maximum value for the packet communication data integrated amount, but causing another operation in accordance with the second terminal controlling parameter to be performed when the packet communication data integrated amount exceeds a dynamic estimated packet amount determined by calculation at a rate of days from the maximum value for the packet communication data integrated amount set arbitrarily within the accounting period.

9. A portable information terminal as claimed in claim 8, wherein said inputting means further inputs and sets an arbitrary one of a plurality of second terminal controlling parameters, and said control means determines a dynamic estimated packet amount by calculation at a rate of days from the maximum value for the packet communication data integrated amount set arbitrarily within the period set in advance, compares the dynamic estimated packet amount with the packet communication data integrated amount integrated by said integrating means, and performs an operation in accordance with the second terminal controlling parameter inputted by said inputting means when a second comparison result indicating that the packet communication data integrated amount exceeds the dynamic estimated packet amount is obtained.

10. A portable information terminal as claimed in claim 9, wherein the first and second terminal controlling parameters include a disconnection parameter, and where the disconnection parameter is set as the first terminal controlling parameter by said inputting means, said control means performs a disconnection process when the packet communication data integrated amount exceeds the maximum value for the packet communications data integrated amount, but where the disconnection parameter is set as the second terminating control parameter, said control means performs a disconnection process when the packet communication data integrated amount exceeds the dynamic estimated packet amount.

11. A portable information terminal as claimed in claim 9, wherein the first and second terminal controlling parameters include a saving parameter, and where the saving parameter is set as the first terminal controlling parameter by said inputting means, said control means performs a saving process of stopping automatic image reading when the packet communication data integrated amount exceeds the maximum value for the packet communication data integrated amount, but where the saving parameter is set as the second terminating control parameter, said control means performs a saving process of stopping automatic image reading when the packet communication data integrated amount exceeds the dynamic estimated packet amount.

12. A portable information terminal as disclosed in claim 8, where said inputting means further inputs and sets an arbitrary one of a plurality of third terminal controlling parameters, and said control means determines a dynamic estimated packet amount by calculation at a rate of days from the maximum value for the packet communication data integrated amount set arbitrarily within the set period, compares a threshold value obtained by multiplying the dynamic estimated packet amount by a predetermined coefficient smaller than 1 with the packet communication data integrated amount integrated by said integrating means, and performs an operation in accordance with the third terminal controlling parameter inputted by said inputting means when a third comparison result indicating that the packet communication data integrated amount is smaller than the threshold value is obtained.

13. A portable information terminal as claimed in claim 12, wherein said inputting means inputs at least one of a parameter for generating an alarm and another parameter for displaying contents of comparison as the third terminal controlling parameter.

14. A portable information terminal as claimed in claim 10, wherein said controlling means stores a current URL if browsing is proceeding when a disconnection process is performed.

* * * * *